(12) United States Patent
Yoo

(10) Patent No.: US 8,280,363 B2
(45) Date of Patent: Oct. 2, 2012

(54) MOBILE TERMINAL AND METHOD OF CONTROLLING VISUAL APPEARANCE THEREOF

(75) Inventor: Sun-Won Yoo, Anyang (KR)

(73) Assignee: LG Electronics Inc., Seoul (KR)

( * ) Notice: Subject to any disclaimer, the term of this patent is extended or adjusted under 35 U.S.C. 154(b) by 417 days.

(21) Appl. No.: 12/571,293

(22) Filed: Sep. 30, 2009

(65) Prior Publication Data

US 2010/0105442 A1 Apr. 29, 2010

(30) Foreign Application Priority Data

Oct. 27, 2008 (KR) ........................ 10-2008-0105503

(51) Int. Cl.
*H04M 3/00* (2006.01)
*H04M 1/00* (2006.01)
(52) U.S. Cl. ...................... 455/418; 455/556.1; 455/566
(58) Field of Classification Search .................. None
See application file for complete search history.

(56) References Cited

U.S. PATENT DOCUMENTS

| 6,498,600 | B1 * | 12/2002 | Vance et al. ................. 345/168 |
| 2005/0037815 | A1 | 2/2005 | Besharat et al. | |
| 2005/0130680 | A1 | 6/2005 | Northcutt | |
| 2005/0190196 | A1 | 9/2005 | O'Neil et al. | |
| 2006/0166702 | A1 | 7/2006 | Dietz et al. | |
| 2006/0281497 | A1 * | 12/2006 | Lai et al. ........................ 455/566 |
| 2009/0042605 | A1 * | 2/2009 | Reponen .................... 455/556.1 |

FOREIGN PATENT DOCUMENTS

| JP | 2005-151271 | 6/2005 |
| WO | 01-13209 | 2/2001 |
| WO | 2007-072352 | 6/2007 |

* cited by examiner

*Primary Examiner* — Erika Gary

(74) *Attorney, Agent, or Firm* — Lee, Hong, Degerman, Kang & Waimey

(57) ABSTRACT

According to an embodiment of the present invention, In accordance with one embodiment, a method for controlling a visual appearance of a mobile terminal is described. The method includes sensing a property of an object or environment external to the mobile terminal and controlling the visual appearance of at least one portion of the mobile terminal according to the sensed property. According to another embodiment, a mobile terminal includes a sensor configured to sense a property of an object or environment external to the mobile terminal, and a controller configured to control a visual appearance of at least one portion of the mobile terminal according to the sensed property.

16 Claims, 16 Drawing Sheets

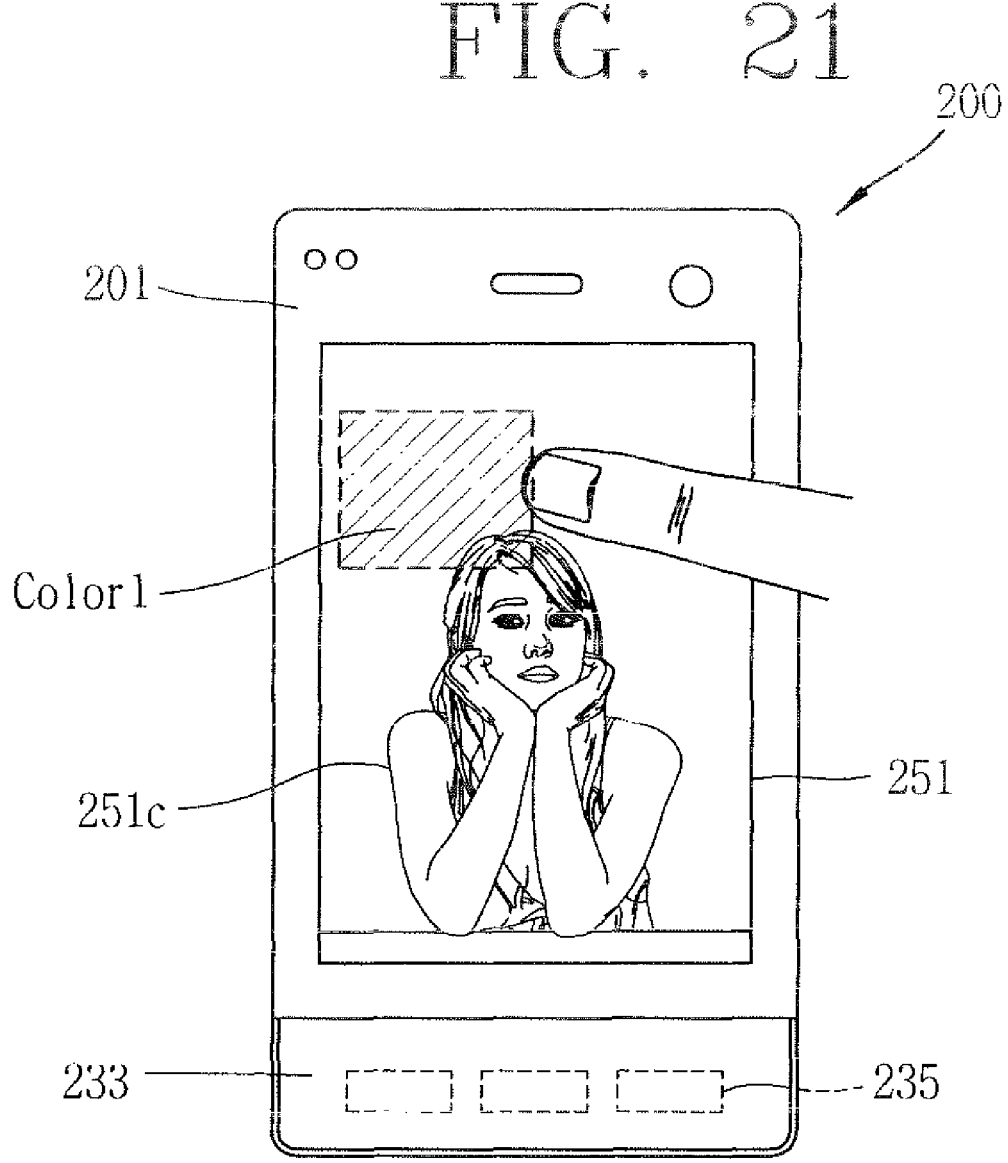

US 8,280,363 B2

MOBILE TERMINAL AND METHOD OF CONTROLLING VISUAL APPEARANCE THEREOF

CROSS-REFERENCE TO RELATED APPLICATIONS

Pursuant to 35 U.S.C. §119(a), this application claims the benefit of earlier filing date and right of priority to Korean Application No. 10-2008-0105503, filed on Oct. 27, 2008, the contents of which are hereby incorporated by reference herein in its entirety.

FIELD OF THE INVENTION

Embodiments of the present invention generally relate to a mobile terminal and, in particular, a mobile terminal having a device for emitting light of one or more colors.

DESCRIPTION OF THE RELATED ART

Mobile terminals can be easily carried (e.g., readily portable) and may be configured to perform one or more functions such as supporting voice and video telephony, inputting and/or outputting information, and storing data. As mobile terminals become increasingly multifunctional, such devices may be configured to capture still images or moving images, play music or video files, play games, and receive broadcasts (e.g., audio or video broadcasts), so as to provide features of an integrated multimedia player.

Various updates have been made for the multimedia devices using hardware or software in order to implement such features. For example, a user interface environment has been provided in order for users to more easily and conveniently retrieve or select functions.

Also, many users use their mobile terminals to express their own personalities, and, accordingly, various design features have been provided in the field of mobile terminals. In accordance with this trend, in addition to supporting the intrinsic (or more basic) function(s) of a mobile terminal, ongoing efforts have been made to provide visual amusement for a user in connection with the appearance and/or user interface of a mobile terminal.

SUMMARY

In accordance with one embodiment, a method for controlling a visual appearance of a mobile terminal is described. The method includes sensing a property of an object or environment external to the mobile terminal and controlling the visual appearance of at least one portion of the mobile terminal according to the sensed property.

In accordance with another embodiment, a mobile terminal includes a sensor configured to sense a property of an object or environment external to the mobile terminal, and a controller configured to control a visual appearance of at least one portion of the mobile terminal according to the sensed property.

In accordance with another embodiment, a method for controlling a visual appearance of a mobile terminal is described. The method includes: controlling a camera device of the mobile terminal to generate an image of an object external to the mobile terminal; extracting information regarding an imaged color of the object from the generated image; controlling a color detection sensor of the mobile terminal to sense a color of the object; processing the generated image by correcting the imaged color of the object based on the sensed color of the object; and displaying the generated image.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects and features of the present disclosure will become more apparent upon consideration of the following description of embodiments, taken in conjunction with the accompanying drawing figures.

FIG. 21 illustrates an operation of the mobile terminal of FIG. 19 in accordance with another embodiment.

DETAILED DESCRIPTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Hereinafter, a mobile terminal according to various embodiments of the present invention will be described in more detail with reference to the accompanying drawings. The use herein of a suffix such as "module" or "unit" is applied merely for ease of description, and the suffix itself does not give any special meaning or function. Therefore, it should be noted that the suffix "module" or "unit" may be interchangeably used relative to each other.

Figure 1:
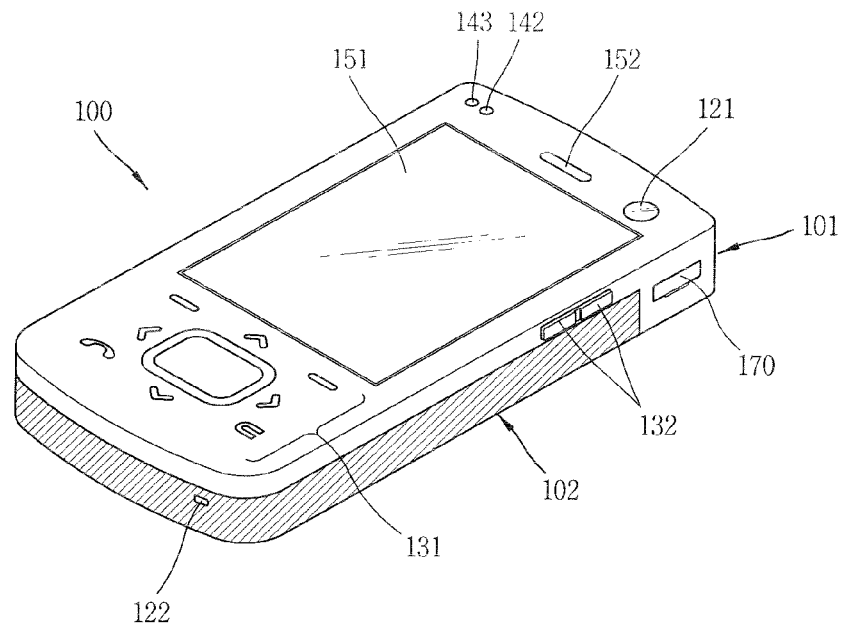
FIG. 1 is a front perspective view illustrating a closed configuration of a mobile terminal according to an embodiment of the present invention.
Figure 2:
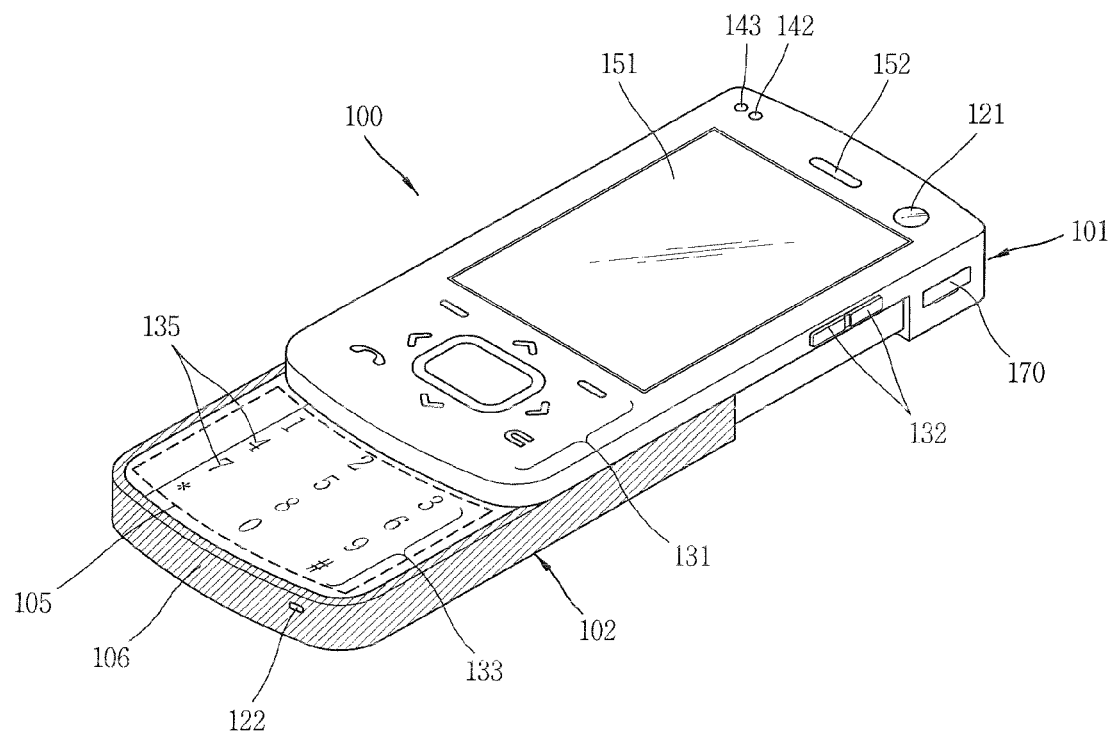
FIG. 2 is a front perspective view illustrating an open configuration of the mobile terminal of FIG. 1.

FIG. 1 is a front perspective view illustrating a closed configuration of a mobile terminal according to an embodiment of the present invention. FIG. 2 is a front perspective view illustrating an open configuration of the mobile terminal of FIG. 1.

Referring to FIGS. 1 and 2, the mobile terminal 100 includes a front body 101 and a rear body 102 slidably coupled to each other. The configuration in which a portion of the rear body 102 is exposed in a forward direction, as illustrated, for example, in FIG. 2, is called an open configuration. Moreover, the configuration in which the exposed portion of the rear body 102 is covered by the front body 101, as illustrated, for example, in FIG. 1, is called a closed configuration.

The front body 101 and rear body 102 may be configured such that they form the shape of a bar when they overlap each other in the closed configuration. Furthermore, the front body 101 and rear body 102 may be configured such that they form a "C"-shaped cross-section when they are disposed to face each other. According to such a configuration, it may be configured a form factor by which a step between a front surface of the front body 101 and a front surface of the rear body 102, or a step between a rear surface of the front body 101 and a rear surface of the rear body 102, can be minimized in the open configuration. For example, the shape and arrangement of this front body 101 can minimize (or reduce) a difference between the thickness of the front body 101 and the overall thickness of the mobile terminal 100, and also minimize (or reduce) a step produced between the front body 101 and rear body 102 in the open configuration.

In the closed configuration, the mobile terminal 100 may operate in a standby mode for most of the time, but the standby mode of operation may be terminated by the user (e.g., by a manipulation (or an operation) of the terminal by the user). In the open configuration, the mobile terminal 100 may operate in mode such as a phone call mode or an edit mode, but it may be switched into a standby mode by a user's manipulation or after a certain period of time has passed.

The features or components disposed on the front body 101 and the rear body 102 may be implemented according to various examples, depending on the type of function or user interface it is intended that the mobile terminal provide. With reference to FIGS. 1 and 2, a display unit 151, audio output unit 152, a first manipulation unit 131, and a first video input unit 121 are disposed on the front body 101.

A case (which may be referred to as a casing, a housing, or a cover) exhibiting an appearance of the front body 101 may be formed with a plurality of elements, and various kinds of electronic components are typically mounted in an inner space (or volume) of the case. According to one embodiment, the case is formed with a transparent material, such the user is allowed to see an illuminating or visual element mounted on the interior thereof.

The first manipulation unit 131 may receive a command for controlling an operation of the mobile terminal 100. According to one embodiment, the first manipulation unit 131 is always exposed regardless of the configuration, open or closed, of the mobile terminal 100. Because the first manipulation unit is exposed in this manner, it is possible to manually operate the first manipulation unit 131, for example, to activate the display unit 151, or to execute a certain mode of the mobile terminal 100.

The first manipulation unit 131 may include touch sensing means (e.g., a touch sensing device) for sensing a touch. The first manipulation unit 131 may additionally include illuminating means (e.g., an illumination- or light-producing device) to implement various illuminating effects in response to a user's input operation.

The display unit 151 may be a device for visually displaying information, and may include displays such as a Liquid Crystal Display (LCD), an Organic Light Emitting Diode (OLED), an e-paper, and a Transparent OLED (TOLED). The display unit 151 may further include a touch sensing unit for facilitating an input of information by a user's touch. As an example, the display unit 151 may display a visual image having a form of a keypad to facilitate an input of numerals, textual characters or functions represented by icons, and the user may input such information by touching the "keypad."

The audio output unit 152 functions to output an audio sound of the mobile terminal. Moreover, the audio output unit 152 may also act as a loud speaker for producing various audio notifications of the system or for reproducing audio of multimedia, or it may further include a separate speaker.

The first video input unit 121 may be implemented using a camera module capturing an image or video. Such a module may be used by the user to perform a self-capture (or self-image) or to capture video in a similar manner.

A proximity detection sensor 142 for sensing the presence of a particular object within a certain distance from the mobile terminal (e.g., an object approaching the mobile terminal to be within such a distance) may be mounted on a front surface of the front body 101. An illumination detection sensor 143 for sensing a circumferential illuminance of the mobile terminal (e.g., a brightness of light around or at a surface of the terminal) may be mounted on a front surface of the front body 101.

The proximity detection sensor 142 may be used to deactivate a touch recognizing function of the mobile terminal when the user's face approaches to be within a certain distance from the mobile terminal by sensing that the user's face is within such a certain distance from the mobile terminal. Therefore, it is possible to prevent (or reduce the occurrence of) a phenomenon where invalid information is entered (or information is unintentionally entered) when the first manipulation unit 131 is touched by the user's face. Furthermore, the illumination detection sensor 143 may be used to control an illumination of the display unit 151 by sensing a circumferential illuminance of (or at) the terminal body 101.

Furthermore, a second manipulation unit 132 and an interface unit 170 may be disposed on a lateral (or side) surface of the front body 101 and rear body 102. The second manipulation unit 132 may operate as a hot-key for performing special functions such as an activation of the video input units 121, 123 (see, for example, FIG. 3). The second manipulation unit 132 may be implemented in any of various ways such that the unit can be manipulated in a tactile manner.

According to an embodiment of the present invention, the interface unit 170 may be used as an interface through which the mobile terminal 100 can exchange data with an external device. For example, the interface unit 170 may be one of a wired/wireless connection port for connecting an earphone to the mobile terminal, a port for short-range communications (e.g., an Infrared Data Association (IrDA) port, a Bluetooth port, a wireless LAN port, etc.), or a power supply port for providing power to the external device. Furthermore, the interface unit 170 may be a card socket for receiving an external card, such as a Subscriber Identity Module (SIM), a User Identity Module (UIM), or a memory card for information storage.

In the open configuration (see, for example, FIG. 2), an exposed portion of the rear body 102 may include a transparent region 105 and a non-transparent region 106. A third manipulation unit 133 facilitating an input of information by a user's manipulation (or manual operation) is disposed on (or at) the transparent region 105.

The third manipulation unit 133 may include a plurality of numerals, characters, and symbols 135 (hereinafter, "numerals") displayed thereon. The numerals 135 may be configured to be illuminated (e.g., for ease of identification or viewability).

Figure 3:
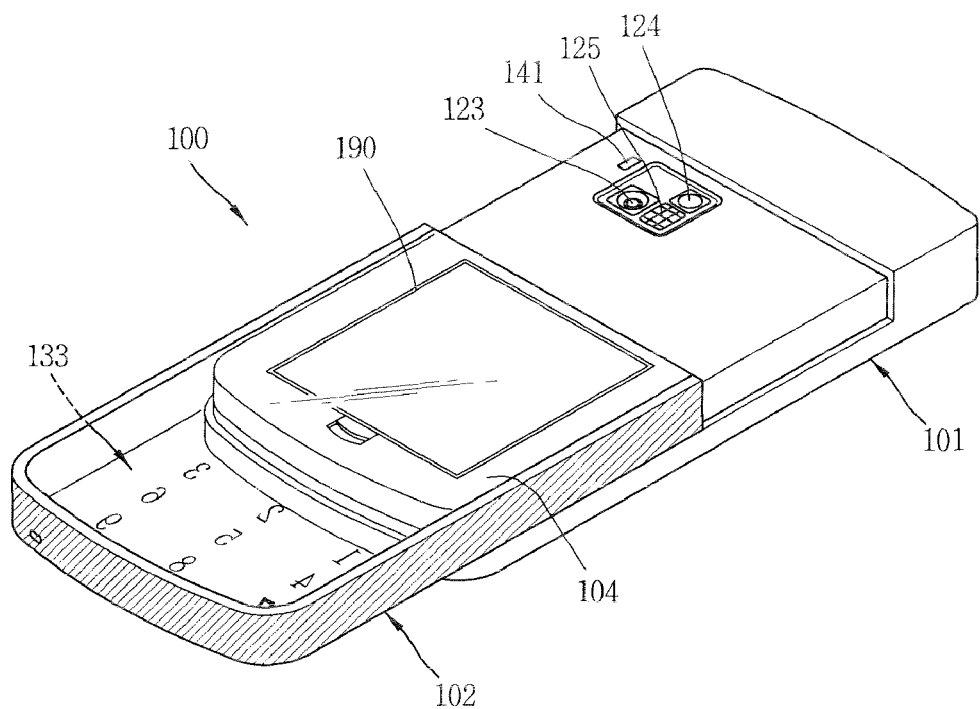
FIG. 3 is a rear perspective view illustrating an open configuration of the mobile terminal of FIG. 2.

FIG. 3 is a rear perspective view illustrating an open configuration of the mobile terminal of FIG. 2. With reference to FIG. 3, a second video input unit 123 and a battery 190 may be mounted on a rear surface of the front body 101. The second video input unit 123 and the battery 190 are covered by a covering portion 104 forming the rear body 102 in the closed configuration, and the second video input unit 123 is exposed in the open configuration.

The second video input unit 123 faces a direction which is opposite to a direction faced by the first video input unit 121, and may have a different pixel resolution from that of the first video input unit 121. For example, relative to the second video input unit, the first video input unit 121 may operate with relatively lower number of pixels (lower resolution). Thus, the first video input unit 121 may be useful when a user captures an image of his own face and sends it to another party during a video call. In contrast, the second video input unit 123 may operate with a relatively higher number of pixels (higher resolution) such that it can be useful for a user to obtain higher quality pictures for later use.

A flash 125 and a mirror 124 may additionally be disposed adjacent to the second video input unit 123. The flash 125 operates in conjunction with the second video input unit 123 when taking a picture using the second video input unit 123. The mirror 124 can be used together with the second video input unit 123 to allow a user to photograph himself in a self-portrait mode.

Furthermore, a color detection sensor 141 for sensing the color of a particular object may be mounted on one side of the second video input unit 123. According to one embodiment, the color detection sensor 141 scans light having a specific (or certain) wavelength over an object and then measures a wavelength of light reflected from the object to sense a color of the object.

The battery 190 may include a rechargeable battery, and may be constructed to be detachable from the front body 101. For this purpose, the covering portion 104 constituting the rear body 102 may be configured to be opened for mounting the battery 190. The battery 190 may be formed in a structure such that a battery cell is integrated with a packing member having the rear shape of the front body 101, thereby reducing the deterioration of appearance when viewing the battery 190 from the outside through the covering portion 104 having a transparent material.

Figure 4:
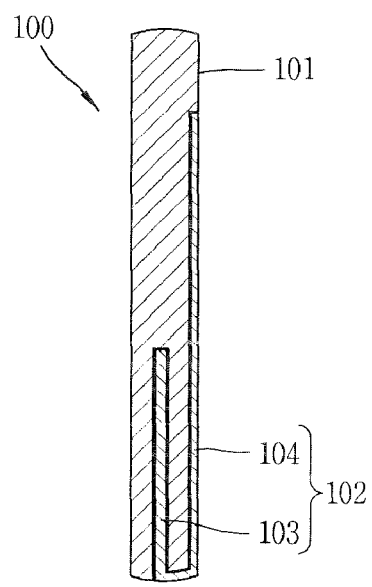
FIGS. 4 and 5 are cross-sectional views illustrating a configuration of a mobile terminal according to an embodiment of the present invention.
Figure 5:
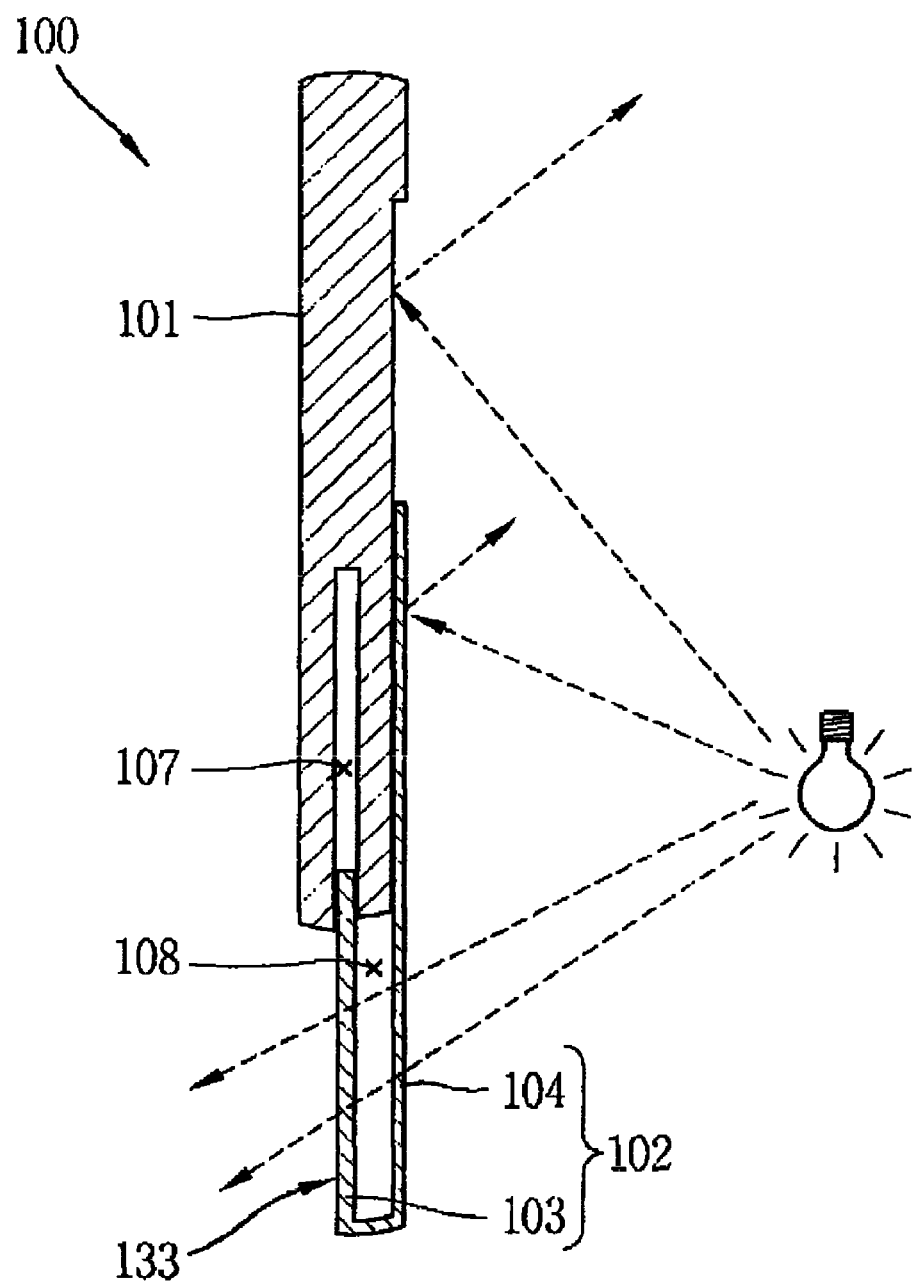

FIGS. 4 and 5 are cross-sectional views illustrating a configuration of a mobile terminal according to an embodiment of the present invention. FIG. 4 is a view illustrating a closed configuration, and FIG. 5 is a view illustrating an open configuration.

The rear body 102 may include a sliding portion 103 and the covering portion 104 coupled to each other. At least one of the sliding portion 103 and covering portion 104 may be formed with a transparent material.

The sliding portion 103 is configured to be slidably inserted into the front body 101 or to be drawn out from the front body 101. In addition, the covering portion 104 is formed to slidably moved along the rear surface (e.g., the rear surface of the front body 101).

Furthermore, a slide hole (or slot) 107 is formed in a lengthwise direction on the front body 101 such that the sliding portion 103 can be inserted therein. Accordingly, the sliding portion 103 will not be seen from the outside when inserted into the slide hole 107 in the closed configuration.

The shape and arrangement of this front body 101 can minimize (or reduce) a difference between the thickness of the front body 101 and the overall thickness of the mobile terminal 100, and also minimize (or reduce) a step produced between the front body 101 and rear body 102 in the open configuration.

Furthermore, an elastic module may be provided between the front body 101 and the rear body 102 to provide an elastic force (e.g., a reactive force) while the front body 101 is moved against the rear body 102. Specifically, the elastic module may be disposed between the front body 101 and the sliding portion 103, or between the front body 101 and the covering portion 104.

Furthermore, an insertion hole (or slot) 108 is formed in the rear body 102 such that the battery 190 of the front body 101 is inserted therein. The insertion hole 108 will be vacant when the battery 190 of the front body 101 moves together with the front body 101. If the covering portion 104 of the third manipulation unit 133 is formed with a transparent material, an object disposed in the opposite side thereof can be seen through the covering portion 104 of the third manipulation unit 133. Here, the term "transparent" may be used interchangeably with the term "fully transparent" or the term "semi-transparent."

Figure 6:
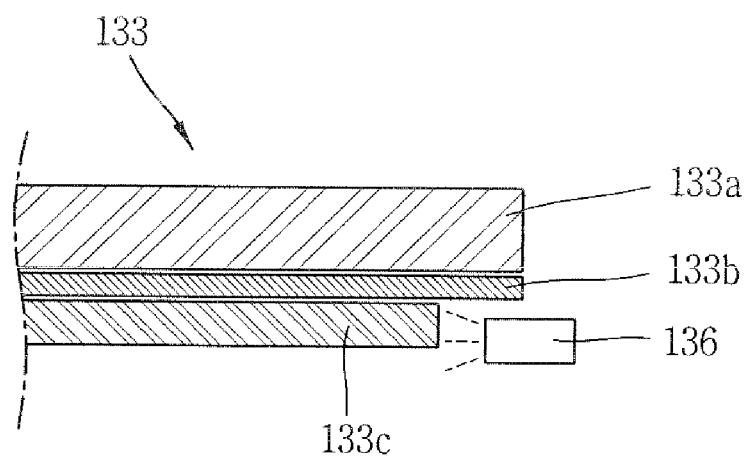
FIG. 6 is a cross-sectional view illustrating a transparent input unit according to an embodiment of the present invention.

FIG. 6 is a cross-sectional view illustrating a transparent input unit according to an embodiment of the present invention.

Referring to FIG. 6, the third manipulation unit 133 includes a transparent protection layer 133a and a transparent touch sensing layer 133b disposed in an inner side of the transparent protection layer 133a. A synthetic resin, such as poly carbonate (PC) having a transparent material, may be used for the transparent protection layer 133a. The protection layer 133a may have a suitable thickness and strength for holding its shape upon a touching of the protective layer.

The touch sensing layer 133b may include a transparent conductive pattern, such as indium tin oxide (ITO), formed on a transparent film. In operation, the touch sensing layer 133b may detect a change of capacitance, detect a proximity of an object, or detect a change of pressure that causes the transparent protection layer 133a to generate an electrical signal.

A transparent protection layer 133a, and a transparent tempered glass layer 133c, which is formed to support the touch sensing layer 133b, are included in an inner side of the touch sensing layer 133b. The tempered glass layer 133c may have a suitably thin thickness, but it may have a rigidity suitable for reducing a distortion in shape caused by a transformation of the transparent protection layer 133.

The numerals 135 indicating one more keys may be formed on the tempered glass layer 133c, as illustrated in FIG. 2. Such numerals 135 may be formed using a method of three-dimensional engraving on a surface of the tempered glass layer 133c. Moreover, the numerals 135 may be similar to those displayed on a transparent display element, for example, a liquid crystal, a transparent organic LED (TOLED), and/or an e-paper.

An illuminating unit 136 may be provided at one side of the tempered glass layer 133c, and the illuminating unit 136 may be mounted on the rear body 102. The illuminating unit 136 may provide light that passes through the rear body 102 and that is visible to the user. When the numerals 135 are illuminated by the light produced by the illuminating unit 136, the user may be better able to see the numerals 135.

The illuminating unit 136 may be controlled to emit light having at least one of a plurality of colors. The illuminating unit 136 may implement light having various colors by properly (or suitably) mixing lights having red, green, and/or blue colors. The illuminating unit 136 may be controlled to emit one of a plurality of colors under control of the controller 180 (see, for example, FIG. 23), which will be described in more detail later.

A point light source, such as an RGB light emitting diode (LED), may be used for the illuminating unit 136. A plurality of point light sources may be disposed on one side of the tempered glass layer 133c.

Light emitted from the illuminating unit 136 may travel in an inner space (or volume) of the tempered glass layer 133c by reflection and be diffusively reflected to arrive at the numerals 135. Accordingly, the numerals 135, may be illuminated more brightly than other regions of the mobile terminal, allowing the numerals 135 to be more easily viewed by a user.

Figure 7:
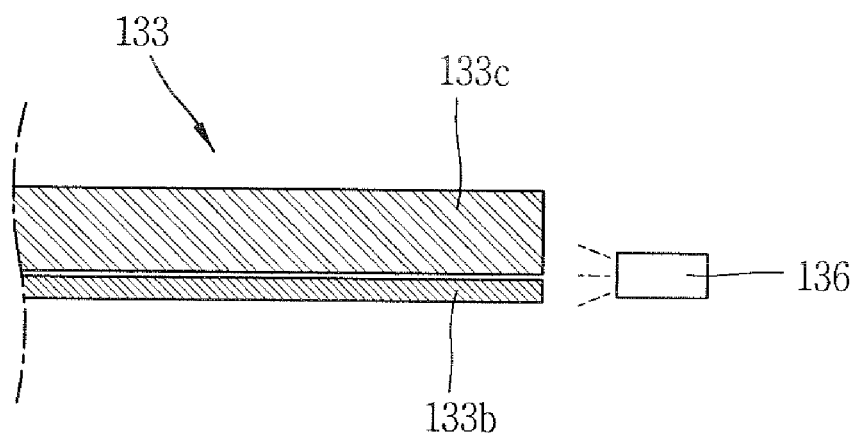
FIG. 7 is a cross-sectional view illustrating another example of a transparent input unit according to an embodiment of the present invention.

FIG. 7 is a cross-sectional view illustrating another example of a transparent input unit (e.g., the third manipulation unit 133) according to an embodiment of the present invention. Referring to FIG. 7, the third manipulation unit 133 includes a transparent tempered glass layer 133c, and a touch sensing layer 133b disposed in an inner side of the tempered glass layer 133c. In other words, in contrast to the embodiment illustrated with reference to FIG. 6, the tempered glass layer 133c is provided to be directly exposed to the outside, thereby protecting a surface of the transparent input unit 133, for example, from external forces that may be applied to the third manipulation unit 133. A plurality of numerals, characters, and symbols may be engraved on the tempered glass layer 133c, and, as previously described with reference to FIG. 6, they can be more readily viewed due to light produced by the illuminating unit 136 disposed on a side of the tempered glass layer 133c.

The embodiments as illustrated in FIGS. 6 and/or 7 may be also applied to the first manipulation unit 131 of FIGS. 1, 2 and/or 3. Here, the illuminating unit 136 may be disposed in an inner space (or volume) of the front body 101 to illuminate the first manipulation unit 131 with light having one or more of various colors.

Figure 8:
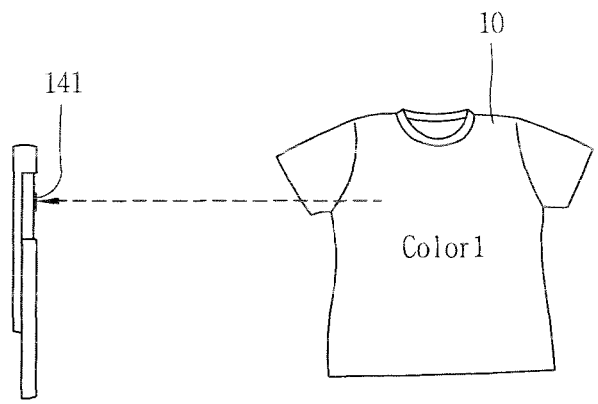
FIGS. 8 and 9 illustrate an operation of a mobile terminal in accordance with an embodiment of the present invention.
Figure 9:
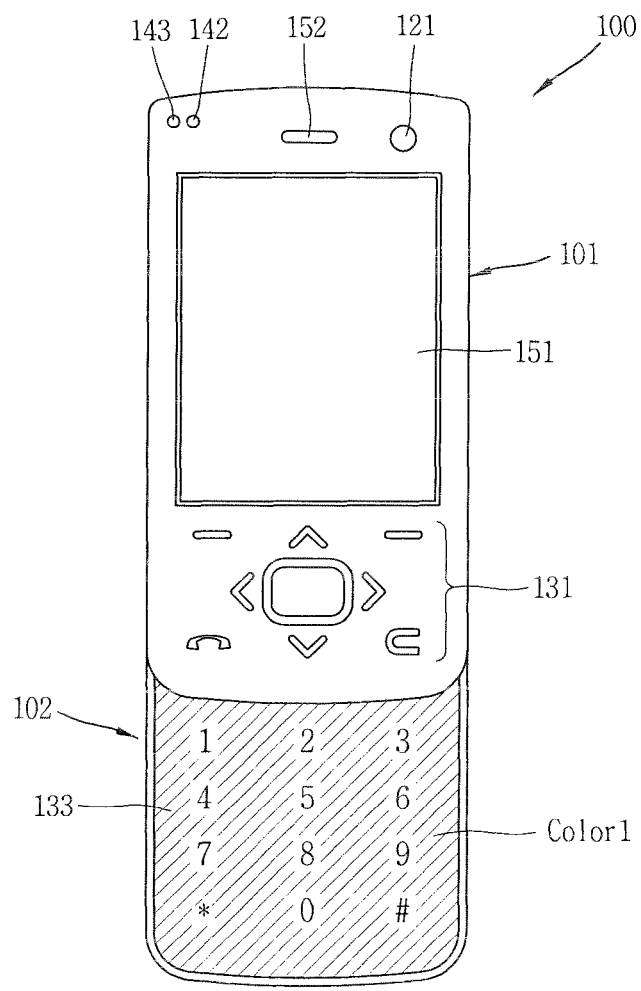

FIGS. 8 and 9 illustrate an operation of a mobile terminal in accordance with an embodiment of the present invention.

As illustrated in FIG. 8, a color of an object disposed adjacent to the mobile terminal 100, for example, a color of a cloth of a shirt 10 (i.e., "color 1"), may be determined (or sensed) by a color detection sensor 141 of the mobile terminal 100. The color detection sensor 141 may scan light having a specific wavelength over an object (e.g., the cloth of the shirt 10) and then measure a wavelength of the light reflected from the object to sense a color of the cloth of the shirt 10 (e.g., "color 1").

The color detection sensor 141 may be controlled to automatically operate as the mobile terminal is switched from the closed configuration into the open configuration. Furthermore, it may be also controlled to operate when a relevant (or corresponding) command is entered via the manipulation units 131, 132, 133. Here, by way of example, the color detection sensor 141 may be controlled to operate to sense a color of the cloth of the shirt 10 (e.g., "color 1").

With reference to FIG. 9, the third manipulation unit 133 may be configured to emit light having (or of) a color (e.g., "color 1") sensed by the color detection sensor 141. The controller 180 controls the illuminating unit 136 to emit light having the same color as the shirt 10 based upon color information sensed by the color detection sensor 141. If the mobile terminal is placed on (or suitably near to) the shirt 10, then the illuminating unit 136 will emit light having the same color as (or a color approximating) the color of the shirt 10 ("color 1"). Accordingly, the user can see a color of the light emitted by the illuminating unit 136 through the third manipulation unit 133 having a transparent material.

The controller 180 may be configured to operate the illuminating unit 136 concurrent with the operation of the color detection sensor 141. For example, if the color detection sensor 141 sequentially detects a series of different colors during operation, then the illuminating unit 136 may be controlled accordingly to sequentially emit light having the series of different colors upon the detection by the color detection sensor 141. Alternatively, the controller may be configured to operate the illuminating unit 136 only when a specific command is entered through the manipulation units 131, 132, 133.

Figure 10:
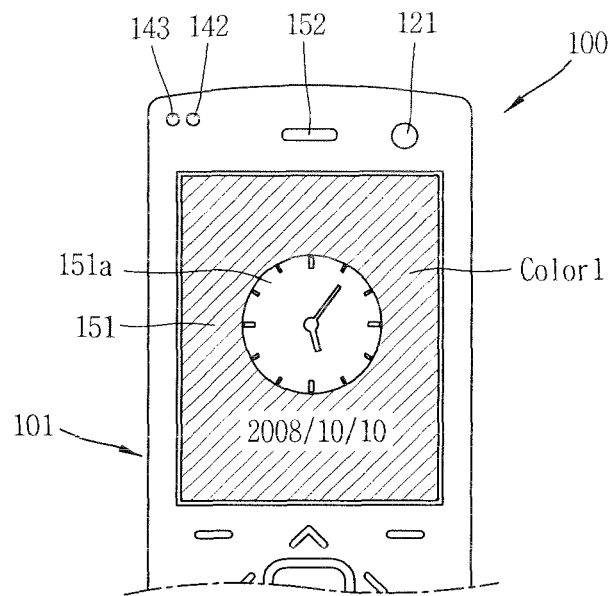
FIGS. 10, 11 and 12 illustrate an operation of a mobile terminal in accordance with another embodiment of the present invention.
Figure 11:
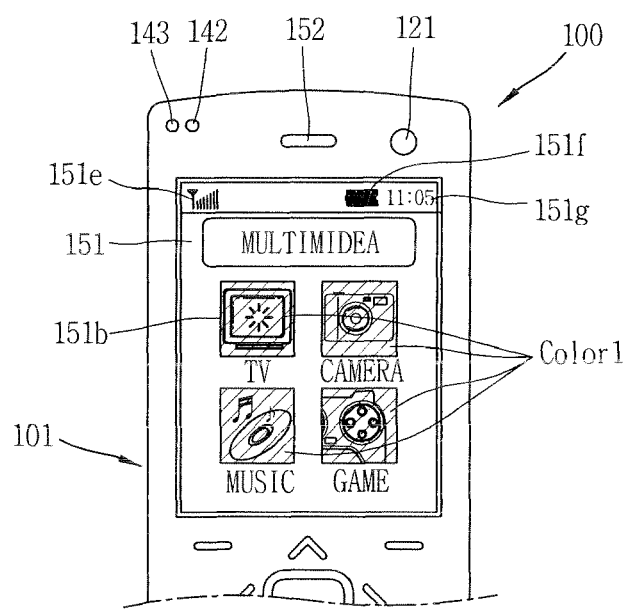
Figure 12:
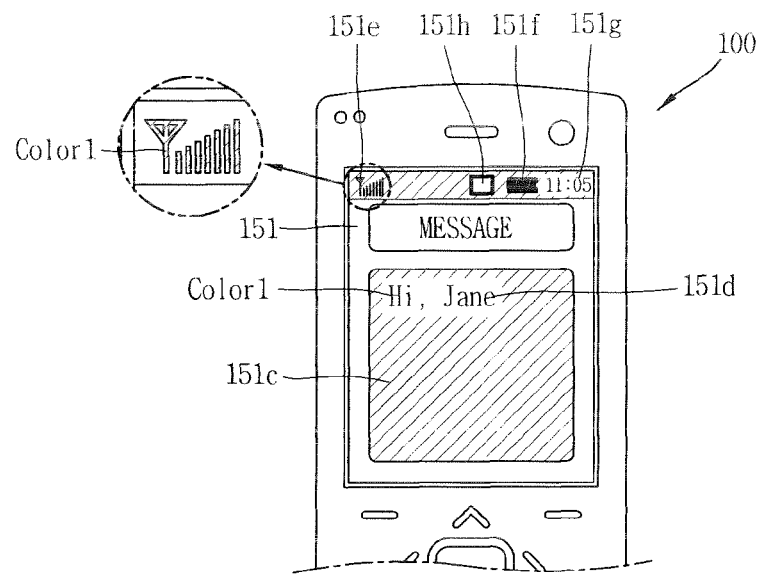

FIGS. 10, 11 and 12 illustrate an operation of a mobile terminal in accordance with another embodiment of the present invention.

With reference to FIGS. 10, 11 and 12, visual (or visible) information having (or of) a specific color is displayed on the display unit 151. The controller 180 controls the display unit 151 to change an output color of the visual information per a color sensed by the color detection sensor 141. FIGS. 10, 11 and 12 illustrate examples of visual information, the color of which can be controlled to change by the controller 180.

FIG. 10 is a view illustrating a standby screen (e.g., a screen background) displayed on the display unit 151. A graphic image 151a showing the time and date information is displayed on the standby screen (e.g., over the screen background). The standby screen is implemented to have a specific color.

Similar to the example described with reference to FIG. 8, upon detection of the color of the shirt 10 ("color 1") by the color detection sensor 141, the controller 180 controls the display unit 151 to change the color of the standby screen into the same color as (or a color approximating) the color of the cloth of the shirt 10 ("color 1") based upon the sensed information. The standby screen may be controlled to have the same color as the color of the objected disposed adjacent to the mobile terminal 100 when the color detection sensor 141 is in operation.

FIG. 11 is a view illustrating icons 151b for activating the execution of certain operation modes (or functions). If any one of the icons 151b displayed on the display unit 151 is touched or selected (for example, using manipulation units 131, 132, 133), then the corresponding operation mode will be executed. Those icons 151b may also have the same color as the color sensed by the color detection sensor 141 ("color 1"), similar to the standby screen described with reference to FIG. 10. This feature may be also applicable to the color of a menu or list that may be displayed on the display unit 151 as well as to the color of the icon.

FIG. 12 illustrates a view of characters and numerals (e.g., text entered for a message transmission) visually displayed on the display unit 151. An output window 151c is displayed on the display unit 151, and a plurality of characters, numerals, and/or symbols (hereinafter, characters) 151d (e.g., characters entered via the third manipulation unit 133) are displayed on the output window 151c. The characters 151d may be displayed in a preset (or default) color (for example, black), and the display color, similar to the examples described with reference to FIGS. 9, 10 and 11, may be changed into a color that is the same as the color of the cloth of the shirt 10, as detected by the color detection sensor 141.

Furthermore, one or more of a graphic image (or indicator) 151e indicating a transmission and/or reception sensitivity of the mobile terminal, a graphic image 151f indicating a remaining charge of the battery 190, a numerical value (or indicator) 151g indicating the time information, and a graphic image 151h indicating a current operating mode (for example, a vibration mode) may be displayed on an upper portion of the display unit 151. Similar to the examples described with reference to FIGS. 9, 10 and 11, such images or numerical values 151e, 151f, 151g, 151h may also be displayed with a color that is the same as the color sensed by the color detection sensor 141.

Figure 23:
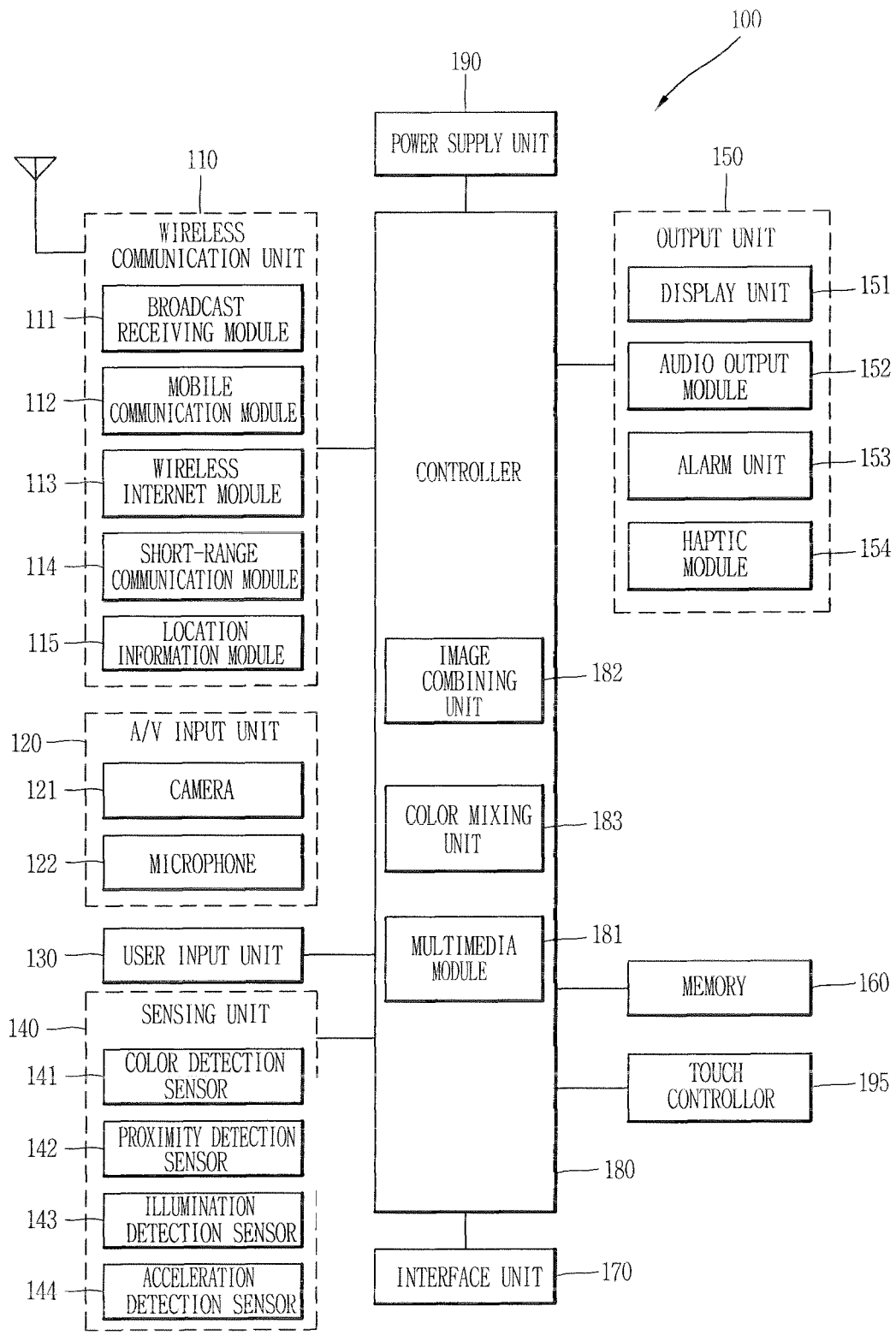
FIG. 23 is a block diagram of a mobile terminal in accordance with an embodiment of the present invention.

The color sensed by the color detection sensor 141 may be stored in a memory 160 (see, for example, FIG. 23). According to one embodiment, the color ("color 1") stored in the memory 160 may be loaded (or entered) by the user, and the loaded color ("color 1") may be applied to the visual information 151a, 151b, 151c, 151d, 151e, 151f, 151g, 151h in a manner similar to that previously described.

Figure 13:
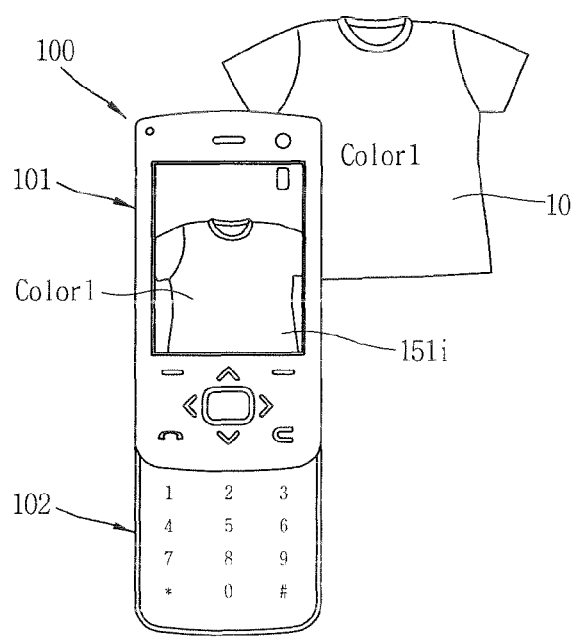
FIG. 13 illustrates an operation of a mobile terminal in accordance with still another embodiment of the present invention.

FIG. 13 illustrates an operation of a mobile terminal in accordance with still another embodiment of the present invention. With reference to FIG. 13, an image of a certain object, for example, a shirt 10 is captured by using a second video input unit (e.g., a camera module) 123.

The captured image 151i captured by the camera module 123 is displayed on the display unit 151. The color detection sensor 141 is configured to sense a color ("color 1") of the object 10 concurrent with the operation the camera module 123.

The mobile terminal 100 may include an image combining unit 182 (see, for example, FIG. 23) for combining information of the captured image 151i captured by the camera module 123 with the color information of the subject 10 sensed by the color detection sensor 141.

According to one embodiment, the image combining unit 182 extracts information related only to the appearance (e.g., the color) of the subject from the information of the captured image 151i, combines the extracted information and the color information sensed by the color detection sensor 141, and then produces a combination of the extracted information and the color information sensed by the color detection sensor 141. Accordingly, the captured image 151i of the subject 10, as displayed on the display unit 151, has a color ("color 1") sensed by the color detection sensor 141.

As such, the captured image 151i captured by the camera module 123 may be corrected via the image combining unit 182, such that the image displays a color that may be more true to (or more accurate with respect to) the actual color of the subject 10. The image combining unit may be included in the controller 180 or provided separately from the controller 180.

Figure 14:
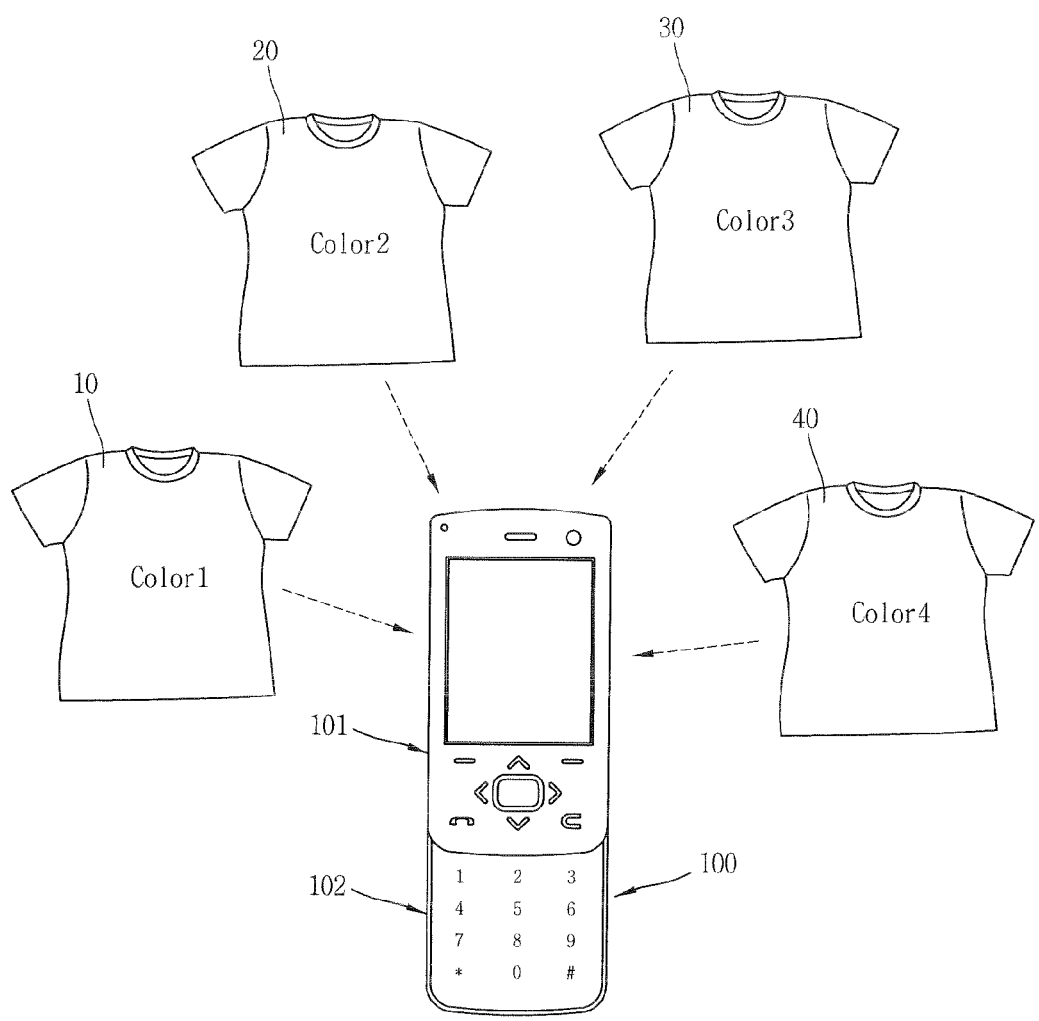
FIGS. 14, 15 and 16 illustrate an operation of a mobile terminal in accordance with yet another embodiment of the present invention.
Figure 15:
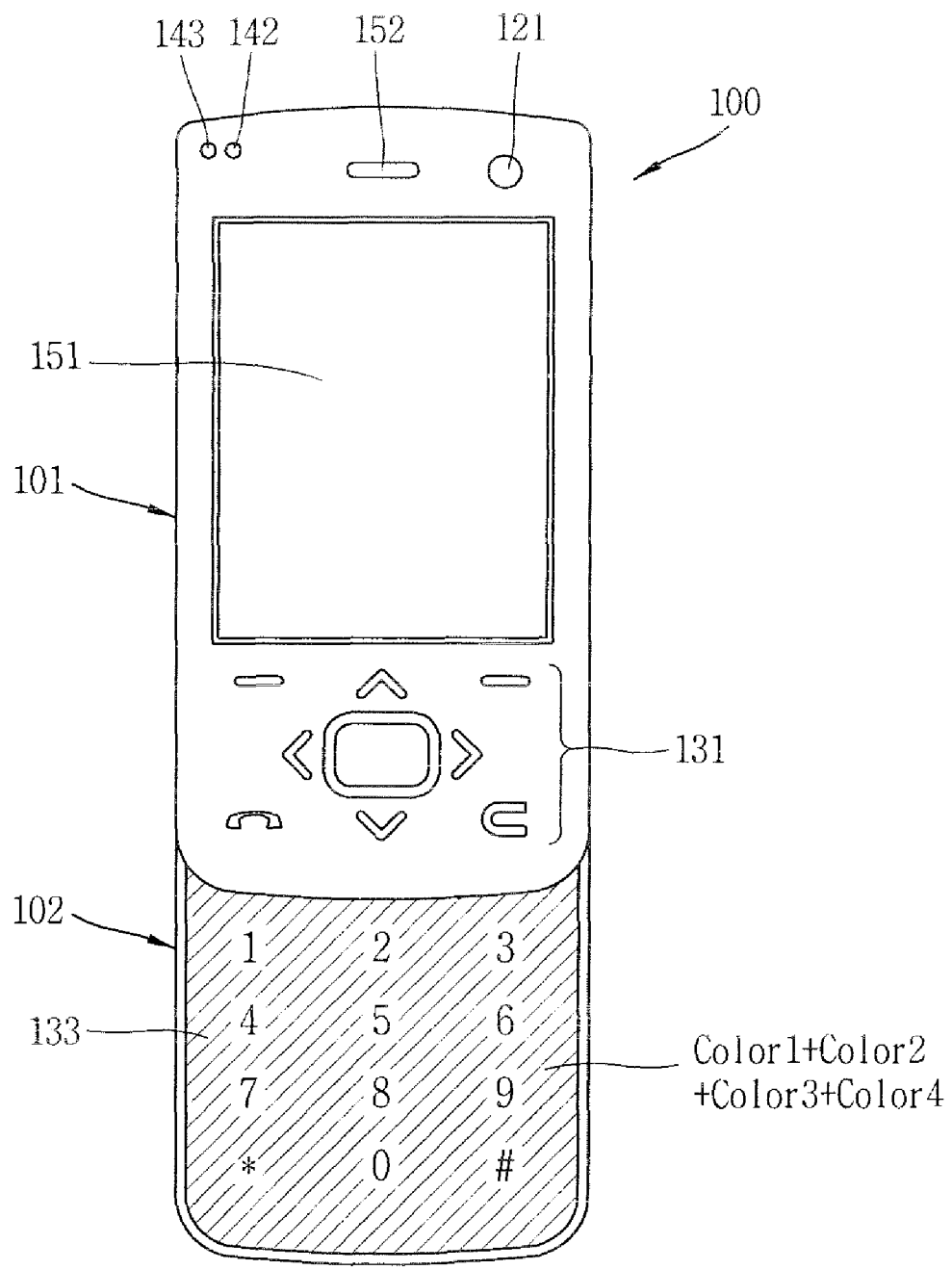
Figure 16:
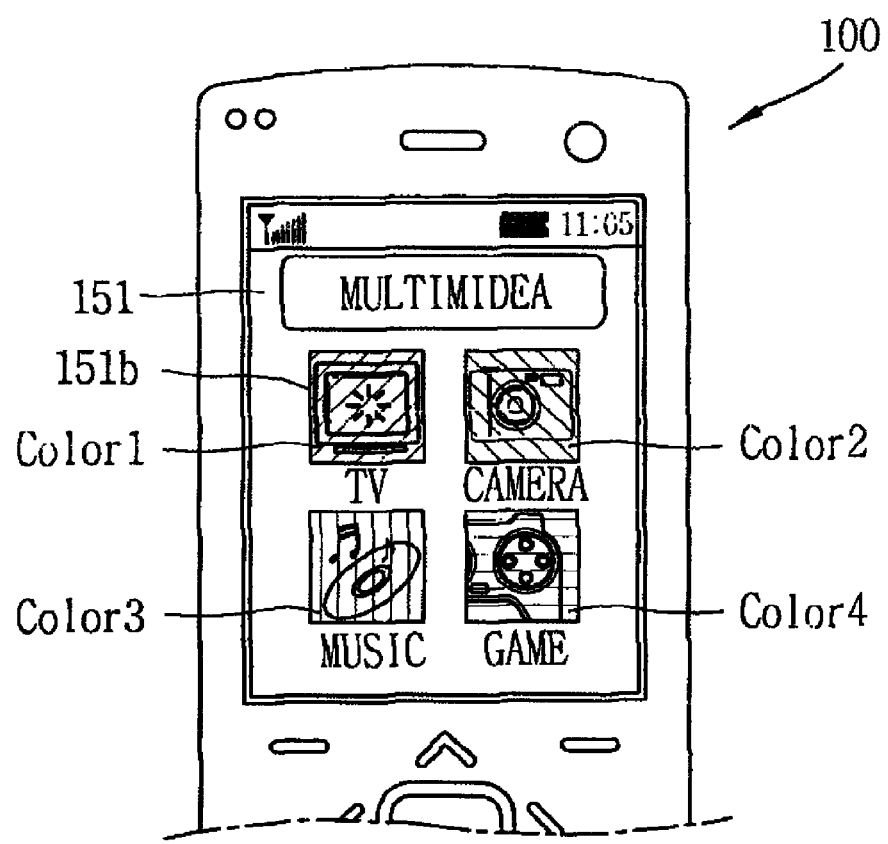

FIGS. 14, 15 and 16 illustrate an operation of a mobile terminal in accordance with yet another embodiment of the present invention.

With reference to FIG. 14, the respective color of each of a plurality of objects 10, 20, 30, 40 is sensed using the color detection sensor 141. For example, the color detection sensor sequentially senses the colors (e.g., "color 1," "color 2," "color 3," and "color 4") of objects 10, 20, 30, 40 that are located within a certain distance of the mobile terminal. The sensed colors ("color 1," "color 2," "color 3," and "color 4") may be stored in the memory 160.

As illustrated in FIG. 15, the third manipulation unit 133 may be illuminated by light having a color resulting from a mix (or a blend) of the sensed colors ("color 1," "color 2," "color 3," and "color 4"). For this purpose, the mobile terminal 100 includes a color mixing unit 183 for implementing a mixed color by mixing the colors ("color 1," "color 2," "color 3," and "color 4") stored in the memory 160. The color mixing unit 183, similar to the image combining unit 182 described above, may be included in the controller 180, or provided separately from the controller 180.

The color mixing unit 183 mixes a plurality of colors (e.g., "color 1," "color 2," "color 3," and "color 4") to provide information of the resulting mixed color to the controller 180. The controller 180 correspondingly controls the illuminating unit 136, such that the illuminating unit 136 produces light having a color corresponding to the resulting mixed color.

The controller 180 may control the color mixing unit 183, such that the color mixing unit mixes colors selected by the user, or mixes the colors successively (or sequentially) sensed over a certain period of time by the color detection sensor 141. Moreover, such a mixed color may be also applied to any of the examples described previously with reference to FIGS. 10, 11, 12 and 13.

With reference to FIG. 16, icons 151b for initiating execution of operation modes provided in the terminal 100 are displayed on the display unit 151. The colors (e.g., "color 1," "color 2," "color 3," and "color 4") stored in the memory may be respectively applied to those icons 151b. For example, with reference to FIG. 16, "color 1" is applied to the icon 151b labeled "TV," "color 2" is applied to the icon 151b labeled "CAMERA," "color 3" is applied to the icon 151b labeled "MUSIC," and "color 4" is applied to the icon 151b labeled "GAME." As described with reference to FIG. 15, colors selected by the user, or the colors successively sensed over a certain period of time may be respectively applied to the icons 151b.

The features described with reference to FIG. 16 may be also applicable to a plurality of items that may be displayed (for example, a menu, or a list), and to a plurality of arranged characters, numerals, and symbols. In other words, one or more of various colors may be applied to the plurality of items and characters, according to colors sensed by the color detection sensor 141.

Figure 17A:
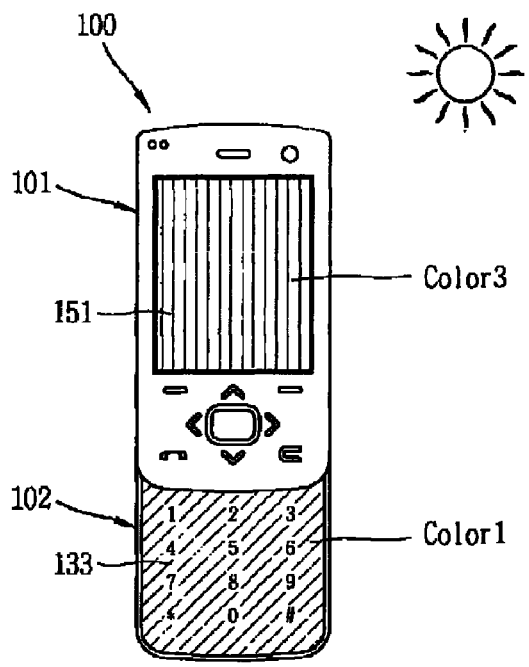
FIGS. 17(a) and 17(b) illustrate an operation of a mobile terminal in accordance with still yet another embodiment of the present invention.
Figure 17B:
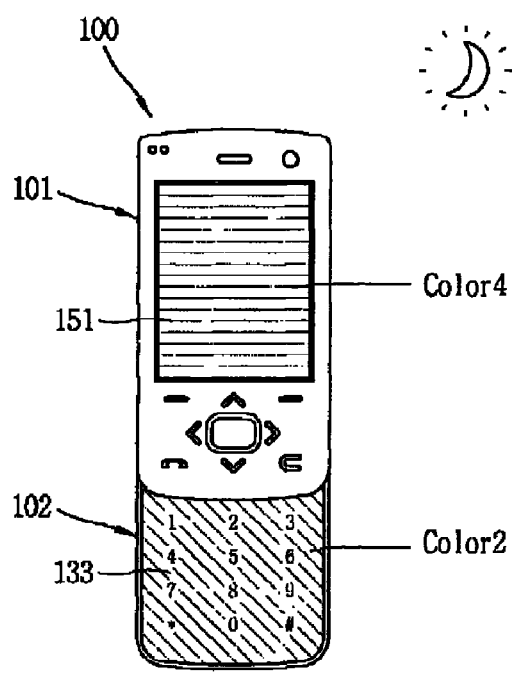

FIGS. 17(a) and 17(b) illustrate an operation of a mobile terminal in accordance with still yet another embodiment of the present invention. With reference to FIGS. 17(a) and 17(b), a color of the light outputted from (or by) the illuminating unit 136 is changed according to an output of the illumination detection sensor 143 (see, for example, FIGS. 1 and 2).

The illumination detection sensor 143 senses a circumferential illumination of the mobile terminal 100. According to one embodiment, the controller 180 controls the illuminating unit 136, such that a color of the light emitted by the illuminating unit 136 is based upon the (level of) illumination of light sensed by the illumination detection sensor 143.

For example, the third manipulation unit 133 may be illuminated (e.g., by the illuminating unit 136) with a first color (e.g., "color 1") if the illumination sensed by the mobile terminal 100 is greater than a certain reference value (for example, in the daytime when the mobile terminal is exposed to broad daylight), as illustrated in FIG. 17(a). The third manipulation unit 133 may be illuminated with a second color (e.g., "color 2") if the illumination sensed by the mobile terminal is less than the reference value (for example, in the nighttime when the mobile terminal is not exposed to broad daylight), as illustrated in FIG. 17(b).

Furthermore, the controller 180 may control the display unit 151 to change a color of visual information displayed on the display unit based upon the value sensed by the illumination detection sensor 143. For example, the standby screen may be displayed with a third color (e.g., "color 3") if the illumination sensed by the mobile terminal is greater than a certain reference value (for example, in the daytime when the mobile terminal 100 is exposed to broad daylight), as illustrated in FIG. 17(a), and the standby screen may be displayed with a fourth color (e.g., "color 4") if the illumination sensed by the mobile terminal is less than the reference value (for example, in the nighttime when the mobile terminal is not exposed to broad daylight), as illustrated in FIG. 17(b). In view of description provided previously with reference to other embodiments, no further description on visual information having variable colors will be provided below.

According to further embodiments, the third manipulation unit 133 may be illuminated with various colors, or the visual information of the display unit 151 may be displayed with various colors, as a circumferential illumination of the mobile terminal 100 is sensed to vary over one or more of a plurality of ranges. For example, the illuminating unit 136 may emit red light if the illumination is sensed to be above 1000 lux, blue light if the sensed illumination is between 500 and 999 lux, and white light if the sensed illumination is below 499 lux. Such features provide visual amusement for the user and allow the user to recognize that changes in the illumination level have occurred.

Figure 18A:
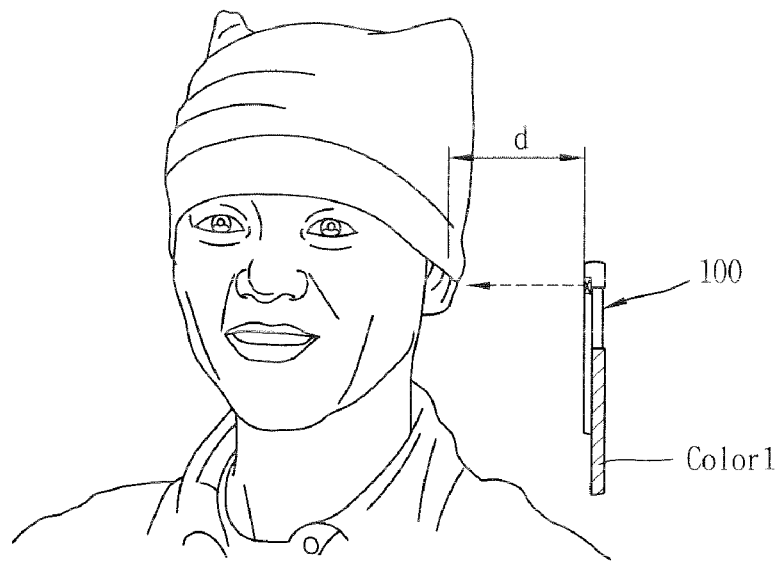
FIGS. 18(a) and 18(b) illustrate an operation of a mobile terminal in accordance with yet still another embodiment of the present invention.
Figure 18B:
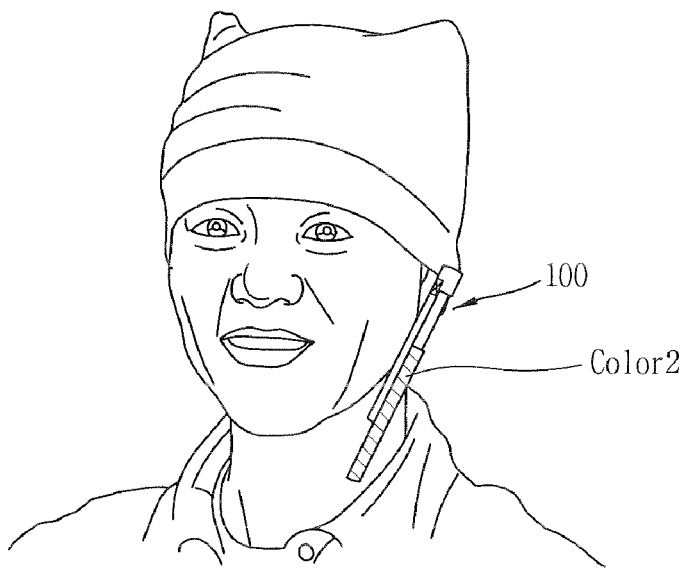

FIGS. 18(a) and 18(b) illustrate an operation of a mobile terminal in accordance with yet still another embodiment of the present invention. With reference to FIGS. 18(a) and 18(b), a color of light outputted from the illuminating unit 136 is changed according to an output of the proximity detection sensor 142 (see, for example, FIGS. 1 and 2).

The proximity detection sensor 142 senses a proximity of a particular object (for example, a user's face) with respect to the mobile terminal 100. For example, the proximity detection sensor 142 may sense a user's face approaching to be within a certain distance from the terminal body. The controller 180 may control the illuminating unit 136, to change a color of light emitted from the illuminating unit 136 based upon a result sensed by the proximity detection sensor 142.

As illustrated in FIG. 18(a), if the user's face is positioned beyond a distance "d" (e.g., it is positioned outside of a detection range of the proximity detection sensor 142), then the third manipulation unit 133 may be illuminated (e.g., by the illuminating unit 136) with light having a first color (e.g., "color 1"). Furthermore, as illustrated in FIG. 18(b), if the user's face is within the distance "d" and is sensed by the proximity detection sensor 142 (e.g., the user's face is within the detection range of the proximity detection sensor 142), then the manipulation unit 133 may be illuminated with light having a second color (e.g., "color 2").

In addition to the above examples, the manipulation unit 133 may be sequentially illuminated by various colors as the user's face approaches increasingly closer to (or farther from) the mobile terminal. In other words, the illuminating unit 136 may emit light having various colors as a sensed distance between the user's face and the mobile terminal 100 varies.

Figure 19:
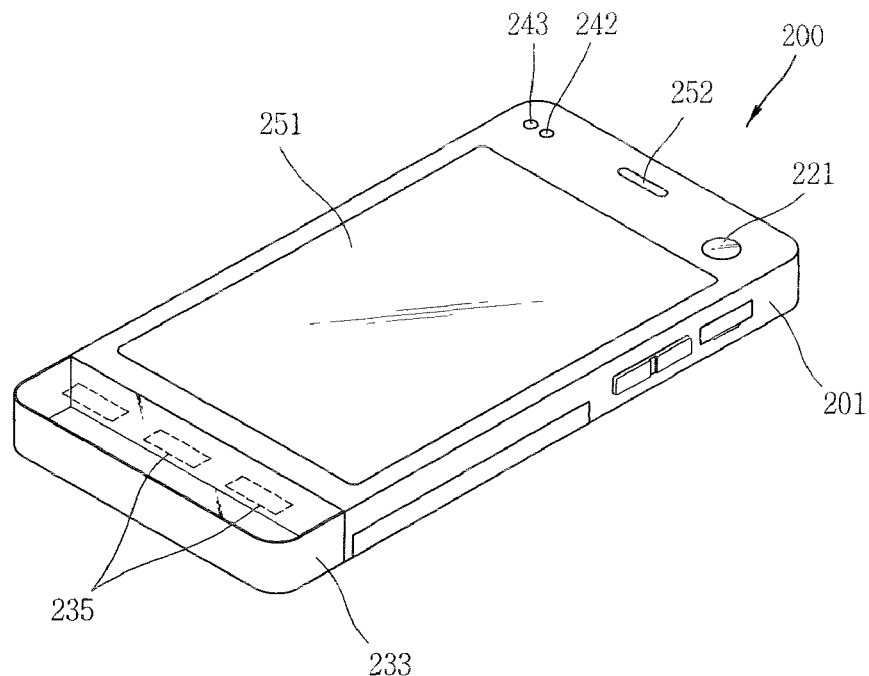
FIG. 19 is a perspective view of a mobile terminal according to another embodiment of the present invention.

FIG. 19 is a perspective view of a mobile terminal according to another embodiment of the present invention. Referring to FIG. 19, a mobile terminal 200 is provided with a terminal body 201 having the shape of a bar. A display unit 251, audio output unit 252, a video input unit 221, a proximity detection sensor 242, and an illumination detection sensor 243 are disposed on a front surface of the terminal body 201. Here, the display unit 251 is configured to have a touch screen function.

A manipulation unit 233, which is transparently or semi-transparently formed below the display unit 251, is provided at a lower end of the terminal body 201. The manipulation unit 233 may have a configuration that is the same as or similar to the third manipulation unit 133, which was described earlier. Therefore, details regarding the manipulation unit 233 will not be provided.

However, in view of the reduced mounting space of the mobile terminal of FIG. 19 (e.g., relative to the mobile terminal of FIGS. 1 and 2), the manipulation unit 233 may include keys 235, one or more of which correspond to several kinds of key functions or directions, in order to reduce the size (or "footprint") of the manipulation unit 233 as much as possible. Similar to the manipulation unit 133, the manipulation unit 233 may be illuminated by light having any one of a plurality of colors, as produced by an illuminating unit.

In addition, though not illustrated in FIG. 19, a color detection sensor may be provided in the terminal body 201 to sense a color of a particular object, and a controller (e.g., a controller similar to the controller 180) may control the illuminating unit to emit light having a color sensed by the color detection sensor. The features described with reference to FIGS. 8, 9, 10, 11, 12, 13, 14, 15, 16, 17(a), 17(b), 18(a) and 18(b) may also be applied to the mobile terminal 200 in a similar manner.

Figure 20:
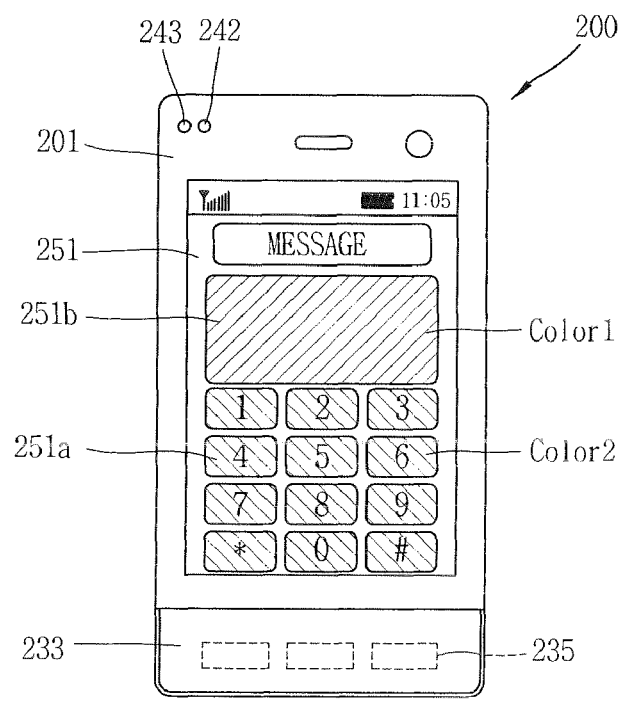
FIG. 20 illustrates an operation of the mobile terminal of FIG. 19 in accordance with one embodiment.

For example, FIG. 20 illustrates an operation of the mobile terminal of FIG. 19 in accordance with one embodiment. A screen for a message transmission is displayed on the display unit 251. Soft keys 251a representing characters, numerals, and symbols, and an output window 251b indicating a manual operation of the soft keys 251a are displayed on the display unit 251.

The display regions corresponding to the soft keys 251a and output window 251b may be selected by a user's touch. As illustrated in FIG. 14, a color detection sensor (e.g., a sensor similar to color detection sensor 141) may sequentially sense the colors (e.g., "color 1," "color 2") of a plurality of objects, and the controller may apply one of the colors (e.g., "color 2") to the soft keys 251a, and another of the colors (e.g., "color 1") to the output window 251b based upon the sensed colors. In addition, the user may select a region corresponding to the soft keys 251a, and a region corresponding to the output window 251b by a touch, and colors stored in the memory 160 may be respectively applied to one or more of the soft keys 251a and the output window 251b.

In addition to the foregoing example, a region selected by a user (e.g., by a user's touch (or manual operation)) may be displayed using a color sensed by the color detection sensor. FIG. 21 illustrates an example of such an operation. In more detail, FIG. 21 illustrates an operation of the mobile terminal of FIG. 19 in accordance with another embodiment.

With reference to FIG. 21, an image 251c, such as an editable photo or picture, is presented on the display unit 251. One region of the image 251c may be selected (e.g., by a "drag" operation by the user), and the region selected by the drag may be displayed with a color sensed by the color detection sensor.

A plurality of regions of the image 251c may be selected in a similar manner (e.g., by a "drag" operation). A plurality of colors sensed by the color detection sensor may be respectively applied to the plurality of selected regions.

Figure 22A:
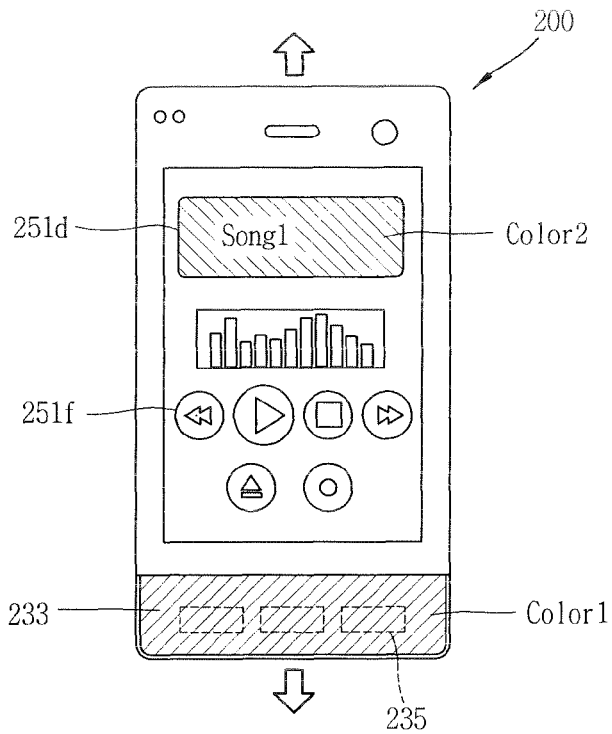
FIGS. 22(a) and 22(b) illustrate an operation of the mobile terminal of FIG. 19 in accordance with another embodiment.
Figure 22B:
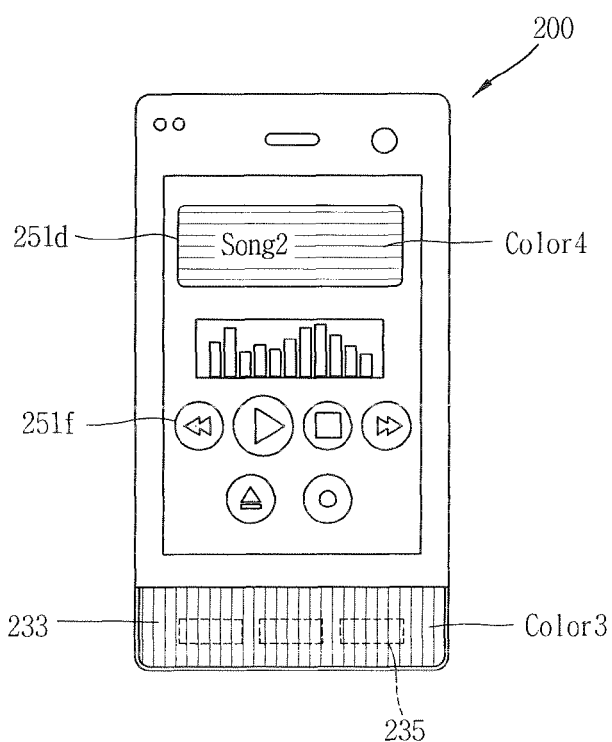

FIGS. 22(a) and 22(b) illustrate an operation of the mobile terminal of FIG. 19 in accordance with another embodiment. With reference to FIGS. 22(a) and 22(b), the mobile terminal 200 is operating in a music playing (or reproduction) mode.

Furthermore, an acceleration (or motion or displacement) detection sensor 144 may be provided in an inner space (or volume) of the mobile terminal 200 to detect a relative movement (or motion or displacement or a certain level thereof) of the terminal body 201. The manipulation unit 233 may be illuminated by light having different colors based upon the results of the detection, and the display unit 251 may also output visual information having different colors based on the results of the detection.

If the user causes a movement of the mobile terminal (for example, if the user shakes the mobile terminal 200 up and down while holding the terminal body in his hands), then the acceleration sensor will detect the movement. Accordingly, the controller will cause the illuminating unit 136 to change a color of the light emitted therefrom and/or control the display unit 251 to change a color of visual information displayed thereon.

As illustrated in FIG. 22(a), a title 251d of the music being reproduced and soft keys 251f for controlling a reproduction of the music may be displayed on the display unit 251. Similar to embodiments previously described, the manipulation unit 233 may be illuminated by light having a first color (e.g., "color 1"), and the title 251d of the music being reproduced may be illuminated by light having a second color (e.g., "color 2").

If the user causes the acceleration detection sensor to detect a movement of the terminal body 201, then the reproduced music may be changed (e.g., randomly changed) as illustrated with reference to FIG. 22(b). For example, the piece of music reproduced may be switched from "Song 1" (see, for example, FIG. 22(a)) to "Song 2" (see, for example, FIG. 22(b)) As a result, the title 251d of the music is displayed accordingly on the display unit 251. In addition, as a result of the detection by the acceleration detection sensor, the manipulation unit 233 may be illuminated by light having a third color (e.g., "color 3"), and the title 251d of the music may be displayed using light having a fourth color (e.g., "color 4").

As described above, according to the foregoing embodiments, a sensor (e.g., an optical sensor) such as a color detection sensor, a proximity detection sensor, or an illumination detection sensor) and an acceleration detection sensor may be utilized in a mobile terminal. However, it is also understood that one or more other types of sensors such as thermal sensors and gyro sensors may also be utilized according to embodiments of the present invention.

Furthermore, according to various embodiments of the present invention, such sensors may be applied to various types of terminals such as folder-type terminals, swivel-type terminals, and swing-type terminals, as well as terminals having a sliding portion or a shape of a bar, as described above.

FIG. 23 is a block diagram of a mobile terminal in accordance with an embodiment of the present invention. The mobile terminal 100 may include components, such as a wireless communication unit 110, an Audio/Video (A/V) input unit 120, a user input unit 130, a sensing unit 140, an output unit 150, a memory 160, an interface unit 170, a controller 180, and a power supply unit 190. With reference to FIG. 1, a mobile terminal 100 having various components is illustrated according to one embodiment, but it is understood that implementing all of the illustrated components is not necessarily required. Rather, a larger or fewer number of components may be implemented.

The wireless communication unit 110 may typically include one or more modules which permit wireless communications between the mobile terminal 100 and a wireless communication system or between the mobile terminal and a network within which the mobile terminal is located. For example, the wireless communication unit 110 may include a broadcast receiving module 111, a mobile communication module 112, a wireless internet module 113, a short-range communication module 114, and/or a position location module 115.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, or a data broadcast signal. The broadcast signal may further include a data broadcast signal combined with a TV or radio broadcast signal.

Examples of broadcast associated information may include information associated with a broadcast channel, a broadcast program, and/or a broadcast service provider. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), and/or Electronic Service Guide (ESG) of Digital Video Broadcast-Handheld (DVB-H).

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), and/or Integrated Services Digital Broadcast-Terrestrial (ISDB-T). The broadcast receiving module 111 may be configured to be suitable for every broadcast system transmitting broadcast signals as well as the digital broadcasting systems. Broadcast signals and/or broadcast associated information received via the broadcast receiving module 111 may be stored in a suitable device, such as the memory 160.

The mobile communication module 112 transmits/receives wireless signals to/from at least one of network entities (e.g., base station, an external mobile terminal, or a server) on a mobile communication network. Here, the wireless signals may include an audio call signal, a video (telephony) call signal, or various formats of data according to transmission/reception of text/multimedia messages.

The wireless internet module 113 supports wireless Internet access for the mobile terminal 100. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), and High Speed Downlink Packet Access (HSDPA).

The short-range communication module 114 denotes a module for short-range communications. Suitable technologies for implementing this module may include BLUETOOTH™, Radio Frequency Identification (RFID), Infrared Data Association (IrDA), Ultra-WideBand (UWB), and/or ZigBee™.

The position location module 115 denotes a module for detecting or calculating a position of a mobile terminal 100. An example of the position location module 115 may include a Global Position System (GPS) module.

The A/V input unit 120 is configured to provide audio or video signal input to the mobile terminal 100. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Two or more cameras 121 may be provided according to the configuration of the mobile terminal.

The microphone 122 may receive an external audio signal while the mobile terminal 100 is in a particular mode, such as a phone call mode, a recording mode, or a voice recognition mode. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data inputted by a user to control the operation of the mobile terminal 100. The user input unit 130 may include a keypad, a dome switch, a touchpad (e.g., static pressure/capacitance), a jog wheel, and/or a jog switch.

The sensing unit 140 provides status measurements of various aspects of the mobile terminal 100. For instance, the sensing unit 140 may detect an open/close status of the mobile terminal 100, a change in a location of the mobile terminal, a presence or absence of user contact with the mobile terminal, the location of the mobile terminal, and/or acceleration/deceleration of the mobile terminal, so as to generate a sensing signal for controlling the operation of the mobile terminal. For example, the sensing unit 140 in a slide-type mobile terminal may sense whether a sliding portion is open or closed. Other examples include sensing functions, such as the presence or absence of power provided by the power supply unit 190, and the presence or absence of a coupling or other connection between the interface unit 170 and an external device. Alternatively, the sensing unit 140 may include a color detection sensor 141, a proximity detection sensor 142, an illumination detection sensor 143, and an acceleration detection sensor 144.

The output unit 150 is configured to output an audio signal, a video signal or a tactile signal. The output unit 150 may include a display unit 151, an audio output module 152, an alarm unit 153, and/or a haptic module 154.

The display unit 151 may output information processed in the mobile terminal 100. For example, when the mobile terminal 100 is operating in a phone call mode, the display unit 151 will provide a User Interface (UI) or a Graphic User Interface (GUI) which includes information associated with the call. As another example, if the mobile terminal 100 is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, and a three-dimensional (3D) display. Some of such displays 151 may be implemented as a transparent type or an optical transparent type through which the exterior is visible, which is referred to as 'transparent display'.

A representative example of the transparent display may include a Transparent OLED (TOLED). The rear surface of the display unit 151 may also be implemented to be optically transparent. Under this configuration, a user can view an object positioned at a rear side of a terminal body through a region occupied by the display unit 151 of the terminal body.

The display unit 151 may be implemented using two or more displays according to an embodiment of the mobile terminal 100. For instance, a plurality of the display units 151 may be arranged on one surface to be spaced apart from or integrated with each other, or may be arranged on different surfaces.

Here, if the display unit 151 and a touch sensitive sensor (referred to as a touch sensor) have a layered structure therebetween, the structure may be referred to as a touch screen. The display unit 151 may be used as an input device rather than (or in addition to) an output device. The touch sensor may be implemented as a touch film, a touch sheet, and/or a touch pad.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller 195. The touch controller 195 processes the received signals, and then transmits corresponding data to the controller 180. Accordingly, the controller 180 may sense which region of the display unit 151 has been touched.

A proximity detection sensor 142 may be arranged at an inner region of the mobile terminal 100 covered by the touch screen, or near the touch screen. The proximity detection sensor 142 may include a sensor for sensing the presence or absence of an object within a certain distance (or range) of the mobile terminal, or of an object disposed at a surface of the mobile terminal 100, by using an electromagnetic field or infrared rays without a mechanical contact. As such, the proximity detection sensor 142 may have a longer lifespan and a more enhanced utility than a contact sensor.

The proximity detection sensor 142 may include a transmissive type photoelectric sensor, a direct reflective type photoelectric sensor, a mirror reflective type photoelectric sensor, a high-frequency oscillation proximity detection sensor, a capacitance type proximity detection sensor, a magnetic type proximity detection sensor, and/or an infrared rays proximity detection sensor. When the touch screen is implemented as a capacitance type touch screen, the proximity of a pointer to the touch screen is sensed by changes of an electromagnetic field. In this case, the touch screen (touch sensor) may be considered as a type of proximity detection sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. The position corresponding to the proximity touch of the pointer on the touch screen corresponds to a position where the pointer faces perpendicular to the touch screen upon the proximity touch of the pointer.

The proximity detection sensor 142 senses proximity touch and proximity touch patterns (e.g., distance, direction, speed, time, position, moving status). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, and a broadcast reception mode. The audio output module 152 may output audio signals relating to functions performed in the mobile terminal 100 (e.g., sound alarming a call received or a message received). The audio output module 152 may include a receiver, a speaker, and/or a buzzer.

The alarm unit 153 outputs signals notifying occurrence of events from the mobile terminal 100. The events occurring from the mobile terminal 100 may include call received, message received, key signal input, and touch input. The alarm unit 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, and reproduction of cold or hot feeling using a heat absorbing device or a heat emitting device.

The haptic module 154 may be configured to transmit tactile effects (signals) through a user's direct contact, or a user's muscular sense using a finger or a hand. The haptic module 154 may be implemented using two or more modules according to embodiments of the mobile terminal 100.

The memory 160 may store a program for the processing and control of the controller 180. Alternatively, the memory 160 may temporarily store input/output data (e.g., phonebook data, messages, still images, video). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, and/or optical disk. Also, the mobile terminal 100 may operate a web storage which performs the storage function of the memory 160 on the Internet.

The interface unit 170 may generally be implemented to interface the mobile terminal 100 with external devices. The interface unit 170 may allow a data reception from an external device, a power delivery to each component in the mobile terminal 100, or a data transmission from the mobile terminal to an external device. The interface unit 170 may include, for example, wired/wireless headset ports, external charger ports, wired/wireless data ports, memory card ports, ports for coupling devices having an identification module, audio Input/Output (I/O) ports, video I/O ports, and/or earphone ports.

The identification module may be configured as a chip for storing various information required to authenticate an authority to use the mobile terminal 100, which may include a User Identity Module (UIM) and/or Subscriber Identity Module (SIM). Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal is connected to the external cradle or as a path for transferring various command signals input from the cradle by a user to the mobile terminal. Such various command signals or power input from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, and video calls. The controller 180 can perform a pattern recognition processing so as to recognize writing or drawing input on the touch screen as text or image.

The controller 180 may include a multimedia module 181 which provides multimedia playback. The multimedia module 181 may be configured as part of the controller 180 or as a separate component.

The power supply unit 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

As described above, according to embodiments of the present invention, the illumination of a mobile terminal and the output color of a display are changed by using a color detection sensor, an illumination detection sensor, a proximity detection sensor, and/or an acceleration detection sensor, thereby configuring the mobile terminal to provide various visual effects and features.

Furthermore, according to embodiments of the present invention, a region of a terminal body is formed with a transparent material to greatly enhance the appearance of a mobile terminal as well as to apply various illuminating or visual effects to a manipulation unit, thereby providing various user interfaces as well as providing visual amusement for the user.

Furthermore, according to an embodiment of the present invention, a slide type terminal for minimizing a step between the bodies in an open configuration is implemented in a new shape, thereby implementing a mobile terminal in a miniaturized and slim package.

The mobile terminal as described above with reference to various embodiments is not limited to the configurations and methods of the foregoing embodiments, but all or part of each embodiment may be selectively combined with each other so as to implement various modifications of the embodiments.

The foregoing embodiments and advantages are merely exemplary and are not to be construed as limiting the present invention. The present teaching can be readily applied to other types of apparatuses and processes. The description of embodiments of the present invention is intended to be illustrative, and not to limit the scope of the claims. Many alternatives, modifications, and variations will be apparent to those skilled in the art.

What is claimed is:

1. A method for controlling a visual appearance of a mobile terminal, the method comprising:
    sensing a color of a first object external to the mobile terminal and a color of a second object external to the mobile terminal using a color detection sensor of the mobile terminal; and
    controlling a visual appearance of a first portion of the mobile terminal and a visual appearance of a second portion of the mobile terminal according, respectively, to the color of the first object and the color of the second object,
    wherein the first portion of the mobile terminal is spaced apart from the second portion of the mobile terminal.

2. The method according to claim 1, wherein controlling the visual appearance of the first portion and the visual appearance of the second portion comprises controlling an illumination device of the mobile terminal to produce light approximating the color of the first object and light approximating the color of the second object.

3. The method according to claim 1, further comprising:
    generating information indicative of a combination of the color of the first object and the color of the second object,
    wherein controlling the visual appearance of the first portion and the visual appearance of the second portion comprises controlling a third portion of the mobile terminal to have a color corresponding to the generated information indicative of the combination.

4. The method according to claim 3, wherein generating the information indicative of the combination of the color of the first object and the color of the second object comprises storing the information in a memory of the mobile terminal.

5. The method according to claim 1, wherein the sensing the color of the first object and the color of the second object comprises storing the color of the first object and the color of the second object in a memory of the mobile terminal.

6. The method according to claim 1, wherein:
    the first portion of the mobile terminal comprises a first group of a plurality of items displayed on a display of the mobile terminal; and
    the second portion of the mobile terminal comprises a second group of the plurality of items displayed on the display.

7. The method according to claim 6, wherein the plurality of items comprise at least two of a menu, a list, a character, a numeral, or a symbol.

8. The method according to claim 1, wherein:
    the first portion of the mobile terminal is a first icon displayed on a display of the mobile terminal; and
    the second portion of the mobile terminal is a second icon displayed on the display.

9. A mobile terminal comprising:
    a color detection sensor configured to sense a property of an object external to the mobile terminal; and
    a controller configured to:
        control the color detection sensor to detect a color of a first object external to the mobile terminal and detect a color of a second object external to the mobile terminal; and
        control a visual appearance of a first portion of the mobile terminal and a visual appearance of a second portion of the mobile terminal according, respectively, to the color of the first object and the color of the second object,
    wherein the first portion of the mobile terminal is spaced apart from the second portion of the mobile terminal.

10. The mobile terminal according to claim 9, further comprising:
    an illumination device,
    wherein the controller is further configured to control the illumination device to produce light approximating the color of the first object and light approximating the color of the second object.

11. The mobile terminal according to claim 9, further comprising:
    a color mixing unit configured to generate information indicative of a combination of the color of the first object and the color of the second object;
    wherein the controller is further configured to control a third portion of the mobile terminal to have a color corresponding to the generated information indicative of the combination.

12. The mobile terminal according to claim 11, wherein the information indicative of the combination of the color of the first object and the color of the second object is stored in a memory of the mobile terminal.

13. The mobile terminal according to claim 9, wherein the color of the first object and the color of the second object are stored in a memory of the mobile terminal.

14. The mobile terminal according to claim 9, wherein:
    the first portion of the mobile terminal comprises a first group of a plurality of items displayed on a display of the mobile terminal; and
    the second portion of the mobile terminal comprises a second group of the plurality of items displayed on the display.

15. The mobile terminal according to claim 14, wherein the plurality of items comprise at least two of a menu, a list, a character, a numeral, or a symbol.

16. The mobile terminal according to claim 9, wherein:
    the first portion of the mobile terminal is a first icon displayed on a display of the mobile terminal; and
    the second portion of the mobile terminal is a second icon displayed on the display.

* * * * *